(12) United States Patent
Hammerslough

(10) Patent No.: US 12,202,561 B2
(45) Date of Patent: Jan. 21, 2025

(54) SCOOTER STAND

(71) Applicant: Resilient Accessories LLC, Jacksonville, FL (US)

(72) Inventor: Charles R. Hammerslough, Jacksonville, FL (US)

(73) Assignee: Resilient Accessories LLC, Jacksonville, FL (US)

( * ) Notice: Subject to any disclaimer, the term of this patent is extended or adjusted under 35 U.S.C. 154(b) by 0 days.

(21) Appl. No.: 18/627,425

(22) Filed: Apr. 4, 2024

(65) Prior Publication Data
US 2024/0336315 A1 Oct. 10, 2024

Related U.S. Application Data

(60) Provisional application No. 63/457,102, filed on Apr. 4, 2023.

(51) Int. Cl.
*B62H 3/02* (2006.01)

(52) U.S. Cl.
CPC ..................................... *B62H 3/02* (2013.01)

(58) Field of Classification Search
CPC ... B62H 3/02; B62H 3/08; B62H 3/00; B62H 3/04; B62H 3/12; B62K 3/002; B66F 7/02
See application file for complete search history.

(56) References Cited

U.S. PATENT DOCUMENTS

| | | | | |
|---|---|---|---|---|
| 445,710 A | * | 2/1891 | Bowen | B62H 3/08 211/20 |
| 481,751 A | * | 8/1892 | Engler | B62H 3/00 211/20 |
| 4,026,546 A | * | 5/1977 | Omori | A63B 69/16 482/61 |
| D449,256 S | * | 10/2001 | Kopacz | D12/115 |
| D488,106 S | * | 4/2004 | Birkmann | D12/115 |
| 7,722,004 B2 | * | 5/2010 | Holden | B29C 51/10 248/346.01 |
| 8,360,252 B1 | * | 1/2013 | Fagan | B62H 3/10 211/21 |
| 9,370,277 B2 | * | 6/2016 | Weaver | A47J 47/16 |
| 9,981,706 B2 | * | 5/2018 | Van Straaten | B62H 3/08 |
| 11,148,740 B2 | * | 10/2021 | Greenblatt | B62H 5/003 |
| 11,352,083 B1 | * | 6/2022 | Gu | B62H 3/04 |
| 11,505,267 B1 | * | 11/2022 | Gu | B62H 3/04 |

(Continued)

FOREIGN PATENT DOCUMENTS

JP 2023098172 A * 7/2023

*Primary Examiner* — Ko H Chan
(74) *Attorney, Agent, or Firm* — Lippes Mathias LLP; Mitchell Ghaneie; Josephine Chen

(57) ABSTRACT

The present invention provides a scooter stand configured to receive a foldable scooter in a vertical position with the rear wheel of the scooter placed above its front wheel. The scooter stand comprises a vertical frame, a horizontal frame perpendicularly coupled to the vertical frame, a ramp and a wheel stop. The vertical frame comprises an adjusting mechanism to vary a height of the vertical frame. The ramp is carried by the horizontal frame and the wheel stop is disposed on the horizontal frame and between the ramp and the vertical frame. The ramp, the wheel stop, and the horizontal frame form a receptacle configured to receive a front wheel of a scooter.

19 Claims, 5 Drawing Sheets

(56) References Cited

U.S. PATENT DOCUMENTS

| | | | |
|---|---|---|---|
| 2008/0223800 A1* | 9/2008 | Cole | B62H 3/04 |
| | | | 211/22 |
| 2009/0051134 A1* | 2/2009 | Clugston | B62H 3/04 |
| | | | 280/87.041 |
| 2015/0158537 A1* | 6/2015 | Haitbrink | B62H 3/08 |
| | | | 248/671 |
| 2021/0016673 A1* | 1/2021 | Howorka | B60L 53/30 |
| 2024/0124080 A1* | 4/2024 | Choi | B60L 53/51 |

* cited by examiner

SCOOTER STAND

CROSS-REFERENCE TO RELATED APPLICATIONS

This application claims priority of U.S. provisional patent application Ser. No. 63/457,102, filed on Apr. 4, 2023, and is hereby incorporated by reference in its entirety for all purposes.

FIELD OF THE INVENTION

The present disclosure relates generally to scooter stands and more specifically to a scooter stand for stand-up foldable electric scooters.

PRIOR ART

Presently in urban areas with higher population density, commuting by automobile may be less convenient and more time-consuming due to heavy traffic and limited parking. As a result, people may preferably opt for other transportation options, including taking public transportations, such as subways and buses, or riding bikes, motorcycles, or scooter that are smaller in size. Among all these options, scooters, especially stand-up electric scooters have become an increasingly popular form of transportation.

Comparing to automobile, stand-up electric scooters are easier to maneuver, agile in congested areas, cost-efficient, and environmentally friendly. For convenience and security, users often store electric scooters within their residences or garages. Nevertheless, a standard stand-up electric scooter takes up about 5 square feet of floor space and can easily tip over if bumped into.

Consequently, there is a need for an adjustable scooter stand configured to secure the stand-up electric scooter in a folded vertical position, to reduce likelihood of tipping over and to reduce required floor space.

SUMMARY OF THE INVENTION

The following is a concise summary of the invention presented herein with the primary aim of providing a preliminary understanding of certain aspects of the invention. It should be noted, however, that this summary is not intended to serve as a comprehensive overview of the invention or the boundaries of its scope. Its sole purpose is to provide a rudimentary understanding of the invention's concept and features, which will be expounded upon in greater detail in the ensuing sections.

A non-limiting exemplary embodiment (the "exemplary embodiment") of the present disclosure provides a scooter stand and is disclosed herein. The exemplary embodiment of the scooter stand generally comprises a vertical frame, a horizontal frame perpendicular coupled to the vertical frame, a ramp carried by the horizontal frame, and a wheel stop. The vertical frame is adjustable to fit various sizes of scooters. The scooter stands holds a folded scooter in a vertical position where the rear wheel of the scooter is above its front wheel. It is preferable that the scooter stand be constructed of rigid or unbendable materials, such as metal or hard plastic.

The vertical frame comprises an adjusting mechanism to vary a height of the vertical frame in a vertical direction and may further comprise two outer vertical bars and two inner vertical bars. The two outer vertical bars are parallelly separated by a predetermined distance and each of the two inner vertical bars are movably disposed within each of the outer vertical bars respectively. A first locking mechanism is positioned at an overlapping portion of the outer vertical bar and the inner vertical bar for locking the vertical frame to a locking position at a desired height.

The horizontal frame has a front end and a rear end. Preferably, the horizontal frame further comprises a front horizontal frame and a rear horizontal frame. The vertical frame is coupled to the front horizontal frame. To provide additional support to the scooter stand, the scooter stand may further comprise at least one support, a front bar, an intermediate bar, and a rear bar. The at least one support couples to the vertical frame on one end and couples to the horizontal frame on another end. The front bar, the intermediate bar, and the rear bar are coplanar and perpendicular to the horizontal frame. The front bar is disposed at the front end of the horizontal frame, the rear bar is disposed at the rear end of the horizontal frame, and the intermediate bar is disposed between the front bar and the rear bar.

The ramp is carried by the horizontal frame at the rear end, and the wheel stop is disposed on the horizontal frame and between the vertical frame and the ramp. The ramp, the wheel stop and the horizontal frame form a receptacle for receiving a front wheel of the scooter. The ramp may be mounted to a bottom plate which may, in turn be coupled to the horizontal frame.

In another aspect, the horizontal frame may be adjustable, such that a length of the horizontal frame may vary to fit various scooters. Furthermore, at least one of the ramp or the wheel stop may also be adjustable to vary a distance between the ramp and the wheel stop, such that the receptacle may be adjusted to accommodate front wheels with various diameters.

In addition, the scooter stand may further comprise a yoke, a concaved linking bar and a strap. The yoke and the concaved linking bar have a substantially U-shaped profile with an opening facing the rear end of the horizontal frame. The yoke is disposed on a top end of the vertical frame, and the concaved linking bar is disposed between the yoke and the at least one support and connecting the spaced apart outer vertical bars.

It is anticipated that the vertical and horizontal frames may vary in form. For example, the vertical frame may instead comprise two spaced apart telescopic vertical tubes, each of which further comprises an outer vertical tube and a movable inner vertical tube partially disposed within the outer vertical tube. Similarly, the horizontal frame may instead comprise two telescopic horizontal tubes separated by a predetermined distance, each including an outer horizontal tube and a movable inner horizontal tube partially disposed within the outer horizontal tube. A bottom end of each of the horizontal tubes is perpendicularly connected to a front portion of each of the respective horizontal tubes.

Advantageously, the exemplary embodiment of the scooter stand not only adjusts to fit various sizes of scooters, but also reduces the required floor space to less than about 2 square feet and prevents the scooters from tipping over.

The above features and advantages will become apparent from the following detailed description taken with the accompanying drawings.

NUMBERING REFERENCE

10—Scooter Stand
100—Vertical Frame
102—Inner Vertical Bar
102a—Top End
102b—Bottom End
104—Outer Vertical Bar
104a—Top End
104b—Bottom End
106—Support
110—First Aperture
112—Adjusting mechanism/First Locking Mechanism
120—Yoke
122—Arm
124—Connecting Member
130—Strap
132—Side Release Buckle
140—Linking Bar
200—Horizontal Frame
200a—Front End
200b—Rear End
202—Front Horizontal Frame
202a—Front End
202b—Rear End
204—Rear Horizontal Frame
204a—Front End
204b—Rear End
204c—Side
206—Bottom Plate
206a—Base
206b—Extensions
210—Second Aperture
212—Second Locking Mechanism
220—Front Bar
222—Intermediate Bar
224—Rear Bar
230—Ramp
230a—Groove
232—Ramp Frame
232a—Ridge Portion
232b—Oblique Surface
234—Wheel Stop
236—Receptacle
240—Helmet Hanger
242—Podium
244—Linking Member
250—Non-skid Pads
300—Scooter
302—Scooter Stem
304—Horizontal Deck
306—Front Wheel
308—Rear Wheel
310—Helmet

DETAILED DESCRIPTION OF THE INVENTION

The following detailed description and accompanying drawings provide a comprehensive disclosure of an exemplary embodiment for the purpose of facilitating one of ordinary skill in the relevant art to make and use the invention. As such, the detailed description and illustration of the one or more exemplary embodiments presented herein are purely exemplary in nature and are not intended to limit the scope of the invention or its protection in any matter. It is further noted that the drawings may not be to scale, and in some cases, certain details may be omitted which are not necessary for an understanding of the present invention, such as conventional details of fabrication and assembly. Furthermore, there is no intention to be bound by any expressed or implied theory presented in the preceding technical field, background, brief summary or the following detailed description.

Figure 1:
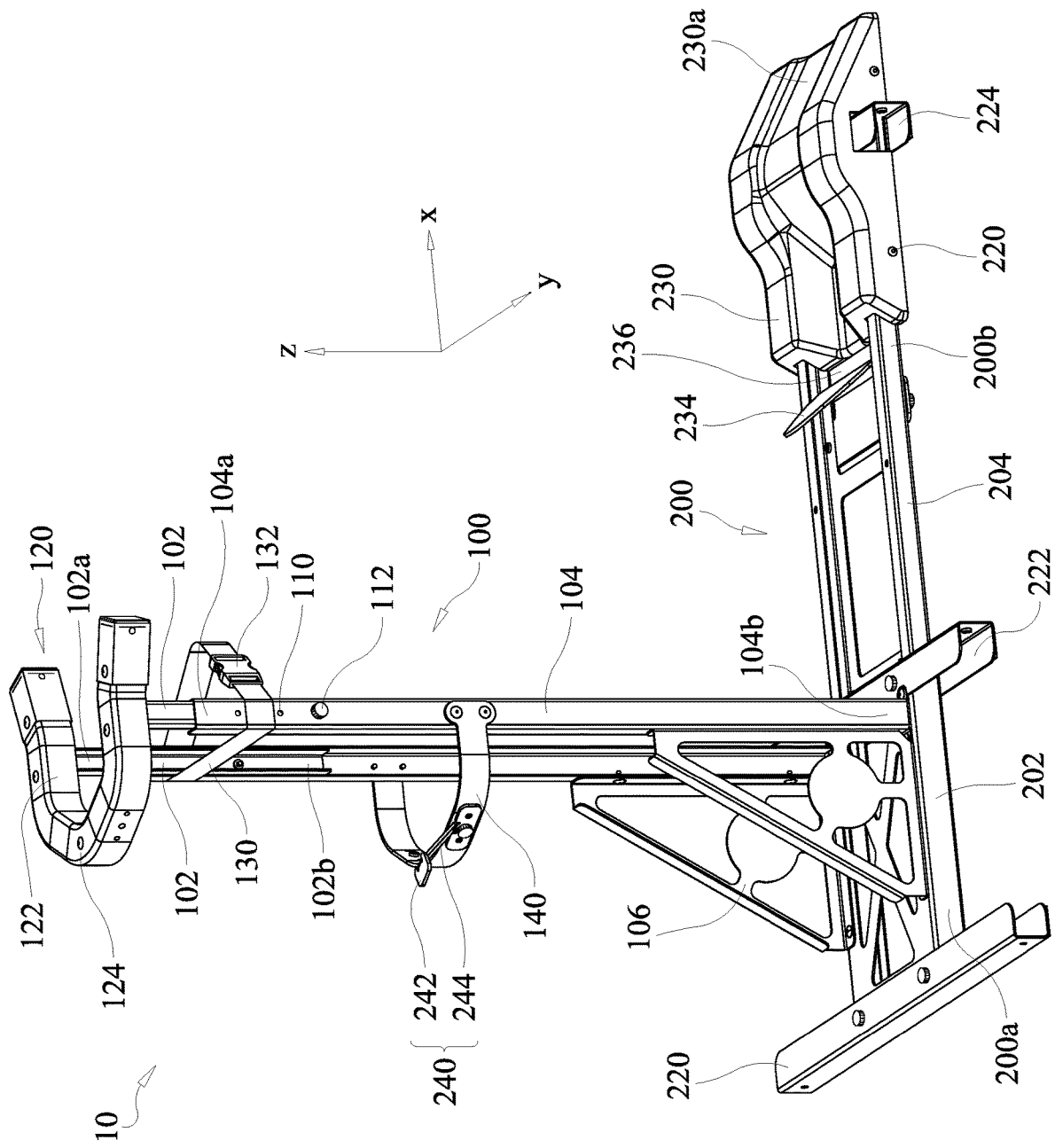
FIG. 1 is a front perspective view of an exemplary embodiment of a scooter stand.

For purposes of description herein, various spatial terms, such as "top", "bottom", "front", "rear", "horizontal", "vertical" and derivatives thereof may be used to describe relative positions of one element and another element with respect to the drawings and shall relate to the device as oriented in FIG. 1. However, it should be understood that these terms are not intended to be limiting or absolute.

A non-limiting, exemplary embodiment (hereinafter as "the exemplary embodiment") of a scooter stand 10 is disclosed herein. The scooter stand 10 provides support to a foldable scooter by holding a folded scooter in a vertical position, thereby minimizing storage space. Moreover, the scooter stand 10 is also adjustable to accommodate various scooters which may vary in size and in diameter of the front wheel.

Referring initially to FIG. 1, a scooter stand 1 is illustrated in accordance with the exemplary embodiment. The scooter stand 1 generally comprises an adjustable vertical frame 100, a horizontal frame 200, a ramp 230, and a wheel stop 22. The vertical frame 100 may extend in a vertical direction z that is perpendicular to a longitudinal direction y and a transverse direction x. The horizontal frame 200 may extend in the transverse direction x. Preferably, the vertical frame 100 is coupled to a front portion of the horizontal frame 200. The vertical frame 100 further comprises two outer vertical bars 104 parallelly separated by a predetermined distance, and two inner vertical bars 102. Each of the outer vertical bars 104 and the inner vertical bars 102 has a top end 102a, 104a and a bottom end 102b, 104b. Each of the inner vertical bars 102 has a smaller width than each of the vertical frame 100 and is partially disposed and movable within the outer vertical bars 104 in the vertical direction z. A first locking mechanism 112, such as utilizing nuts and bolts with apertures 110, as shown in FIG. 1, is positioned at an overlapping portion of the outer vertical bar 102 and the inner vertical bar 104 for locking the vertical frame 100 to a locking position. Each of the inner vertical bars 104 and the outer vertical bars 102 comprises a plurality of apertures 110 aligned in a column along the vertical direction z configured to receive the first locking mechanism 120. As a result, the inner vertical bars 102 may be adjusted to a desired height having one of the apertures 110 of the inner vertical bar 102 aligned with one of the apertures 110 of the inner vertical bar 104, such that the bolt may be inserted through the aligned apertures 110 and be fastened by the nut. The first locking mechanism 112 may alternatively include, but is not limited to screws, latches, button locks, and any suitable adjustable fasteners known in the art. Although the arrangement of the exemplary embodiment shown in FIG. 1, preferably locates the inner vertical bar 102 being movable along the top end 104a of the outer vertical bar 104, this arrangement may be opposite, having the outer vertical bar 104 being movable along the top end 102a of the inner vertical bar 102.

Figure 2:
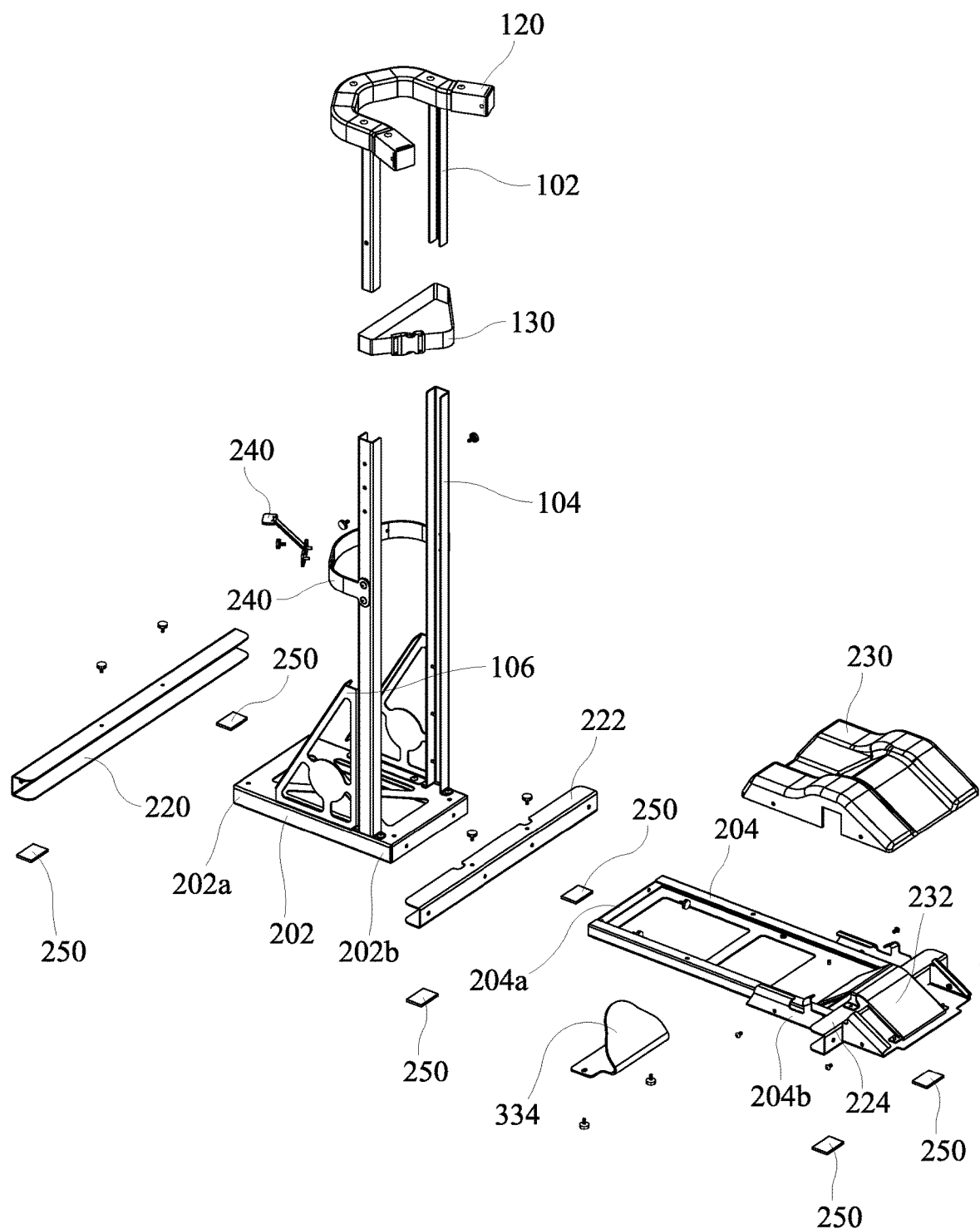
FIG. 2 is a partially explosive view of the exemplary embodiment of the scooter stand.
Figure 3:
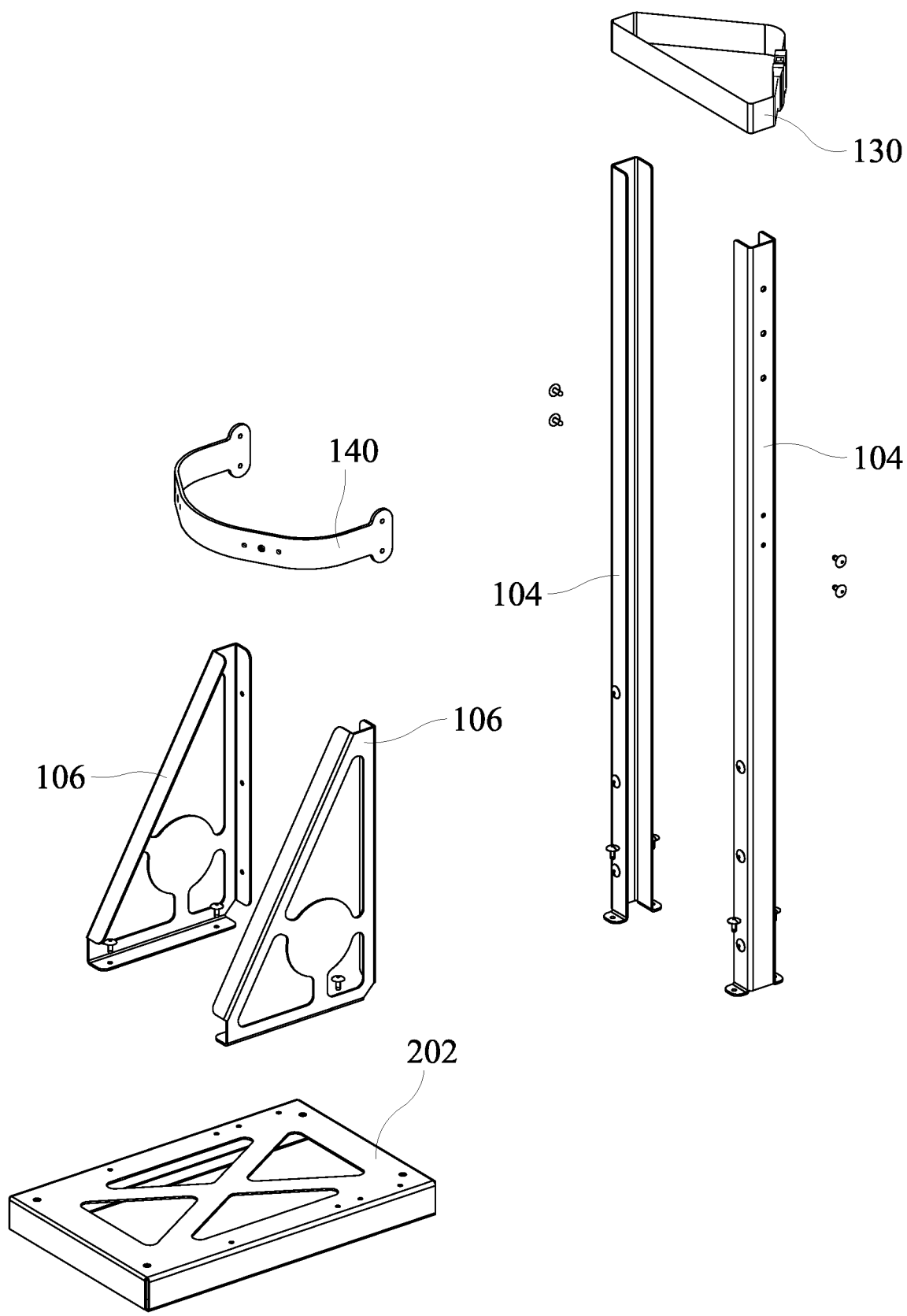
FIG. 3 is a first explosive view showing parts of the exemplary embodiment of the scooter stand.
Figure 5:
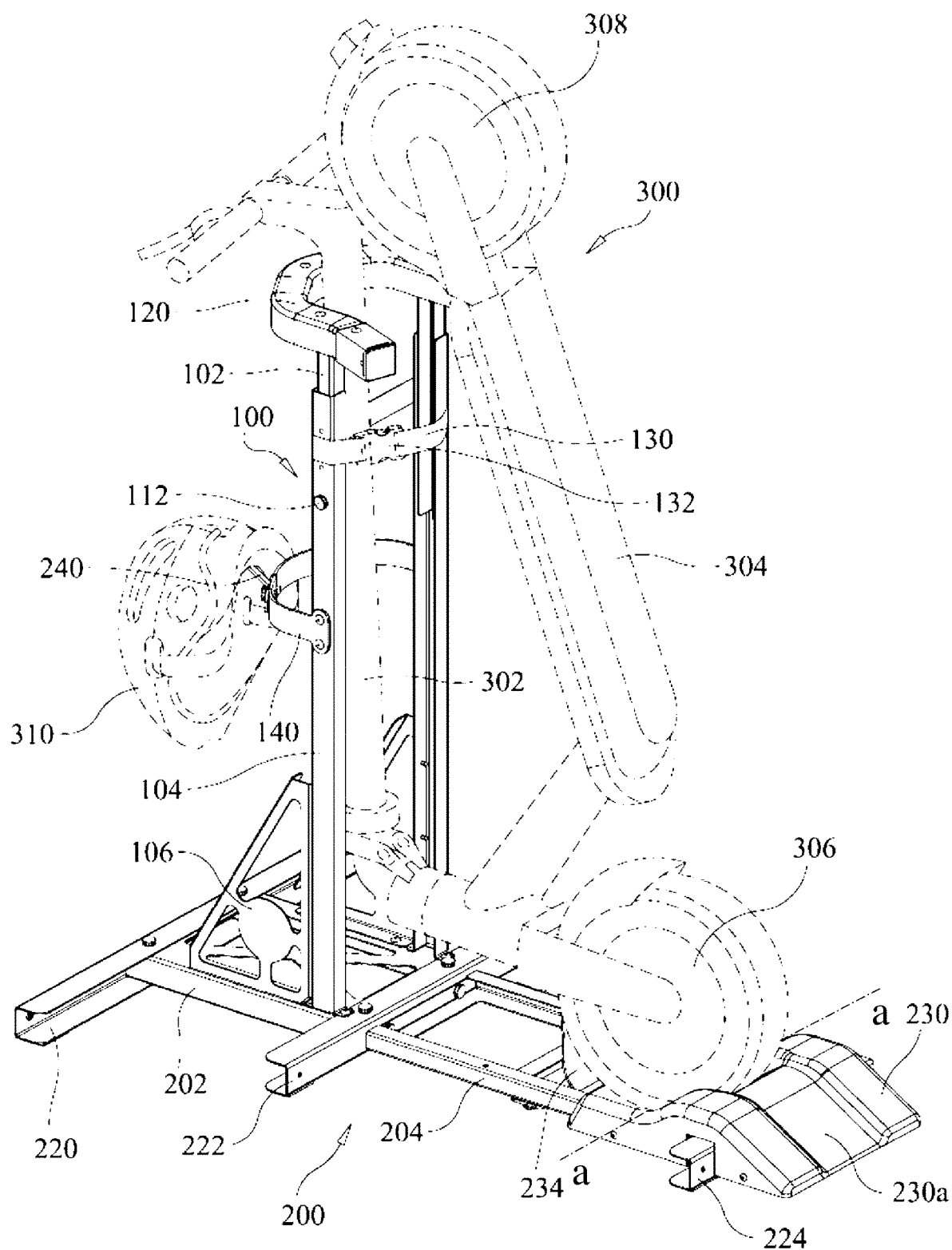
FIG. 5 is an in-use perspective view showing the scooter and helmet held by the scooter stand.

With continue reference to FIG. 1 and in conjunction with FIG. 2, the horizontal frame 200 has a front end 220a and a rear end 220b and further comprises a front horizontal frame 202, a rear horizontal frame 204, and a bottom plate 206. To increase steadiness and securement, the exemplary embodiment further comprises at least one support 160, a front bar 220 and an intermediate bar 222, thereby mitigating the risk of the scooter stand 10 tilting or tipping over. It is preferable that the at least one support 160 has a substantial triangular configuration having a right angle positioned at a joining portion of the vertical frame 100 and the horizontal frame 200, with a first side coupling to the vertical frame 100, and a second side adjacent to the first side coupling the horizontal frame 200. The front bar 220 and the intermediate bar 222 extend in the longitudinal direction y and are coplanar to the horizontal frame 200. The front bar 220 is coupled to a front end 202a of the front horizontal frame 202, and the intermediate bar 222 is coupled to a rear end 202a of the horizontal frame 202 and a front end 204a of the rear horizontal frame 204. The ramp 230 is mounted on the bottom plate 206 which is, in turn, coupled to the rear end of the horizontal frame. The wheel stop 234 is disposed on the horizontal frame 200 and in between the intermediate bar 222 and the ramp 230. The wheel stop 234, the ramp 230 and the horizontal frame 200 form a receptacle configured to receive a front wheel of the scooter. Although the bottom plate 206 is fixed to the horizontal frame 204 in the exemplary embodiment, it is anticipated that the bottom plate 206 may be slidably movable along the horizontal frame 202 in the transverse direction x. With reference to FIG. 5, the receptacle comprises a centroidal axis a-a orthogonal to the horizontal and vertical frame 200, 100, and a distance from the centroidal axis a-a to the joining portion of the vertical frame 100 and the horizontal frame 200 is less than a height of the vertical frame 203.

Figure 4:
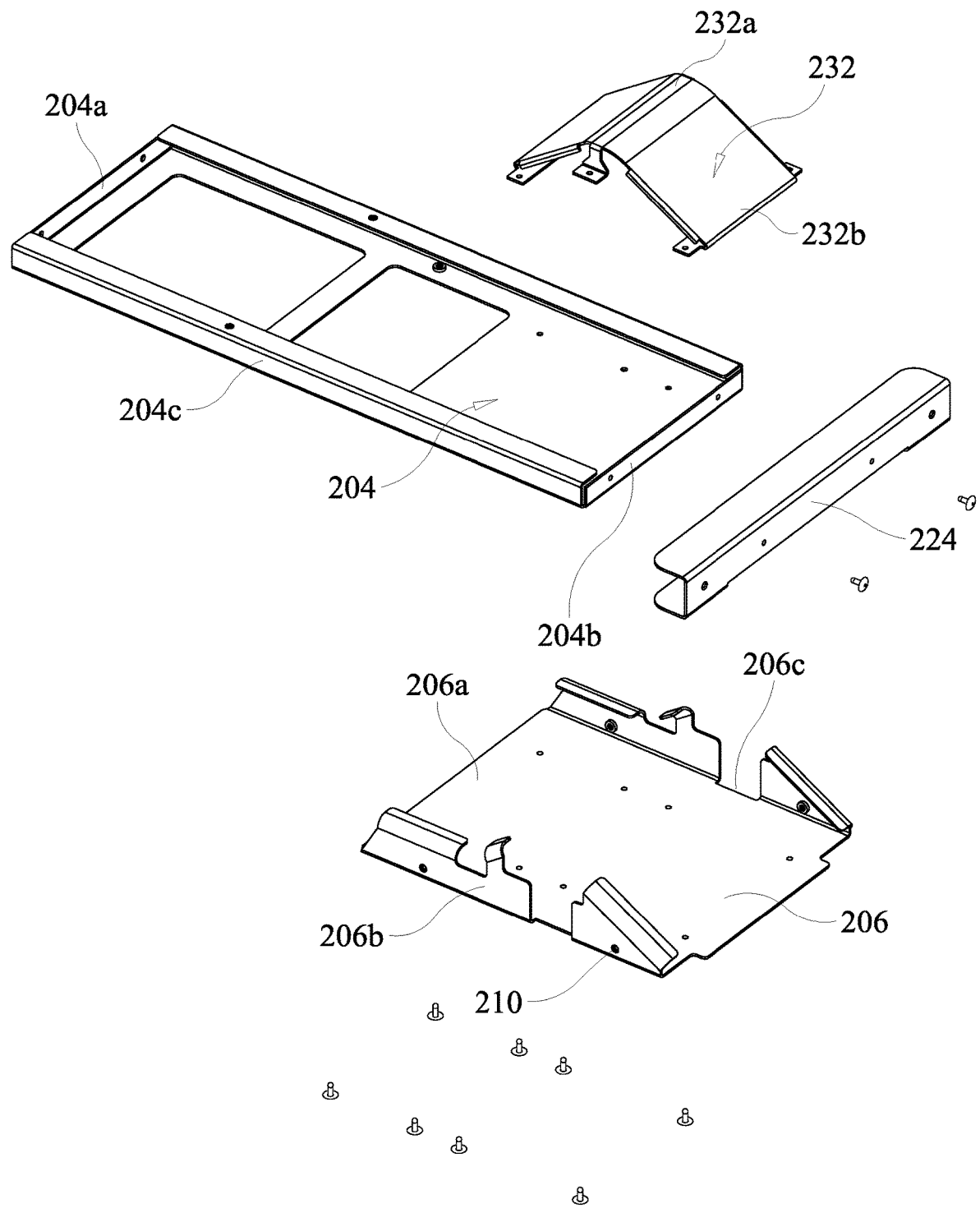
FIG. 4 is a second explosive view showing parts of the exemplary embodiment of the scooter stand.

Turning to FIG. 4 and in conjunction with FIG. 2, the bottom plate 206 further comprises a base 206a and extensions 206b extending upwards from both sides of the base 206. Each of the extensions 206b further includes a notch 206c. The two notches 206 are configured to receive a rear bar 224 which extends along the longitudinal direction y. The rear bar 224 has a length greater than a width of the horizontal frame 200. In addition, a ramp frame 232 having a substantial slope configuration is disposed on the bottom plate 206 and below the ramp 230 to provide additional support to the ramp 230. The ramp frame 232 further has a ridge portion 232a extending along the longitudinal direction y and coupled to the rear bar 224, and two oblique surface 232b sloping down from two sides of the ridge portion 232a and coupled to the base 206a of the glide plate 206. The ramp 230 also has a substantial slope configuration similar to the ramp frame 232. The ramp 230 further comprises a groove 230a elongating along the transverse direction x to guide the movement of the scooter. It is preferable that the ramp 230 be constructed of flexible materials providing a non-slip surface to the front wheel of the scooter. It is anticipated that the shape of the ramp 230 and the wheel stop 234 could vary.

Referring again to FIGS. 1 and 2, the scooter stand 10 further comprises a yoke 120 and a concaved linking bar 140. The yoke 120 and the linking bar 140 are positioned on paralleled xy-planes and have substantially U-shaped profiles with opening ends facing towards the rear end 200b of the horizontal frame 200. The yoke 120 is attached to the top ends 102a of the inner vertical tube 102, and the linking bar 140 is disposed on the vertical frame 100 and between the yoke 120 and the at least one support 106. Preferably, the yoke 120 has two arms 122 and a slightly curved connecting member 124 connecting the two arms 122. Each of the inner vertical tubes 102 is coupled to a middle portion of one of the arms 122, respectively. The linking bar 240 connects the two outer vertical bars 104 forming a space to accommodate a scooter bag that may be attached to the scooter. Moreover, the linking bar 240 may further include a helmet hanger 240. The helmet hanger 240 has a podium 242 and a linking member 244 connecting the podium 240 to the linking bar 140.

Additionally, several accessories may be added to the scooter stand 10 to fit a user's need. As shown in FIGS. 1, 2 and 5, a strap 130 may be used to tie a stem of the scooter to the vertical frame 100. The strap 132 connects to each of the outer vertical tubes 104 and extends rearwardly therefrom, as well as includes a releasably securing means, such as a side release buckle or hook-and-loop surfaces. To provide frictional resistance and to protect floors from scratching, a plurality of non-skid pads 250 may be added beneath surfaces of the horizontal frame 200, as can be seen in FIG. 2. It is also anticipated that that a foam rest (not shown) may be added to the yoke to act as a buffer to reduce impact and thereby protecting the scooter. It is anticipated that a plurality of scooter stands 10 can be linked together at the front bar 202 by an optional connector. The scooter stand 10 further may include a scooter cover for the scooter, a drip tray under the horizontal frame 200, and a cleaning kit.

Referring to FIG. 5, an exemplary method of using the scooter stand 10 is presented herein to further demonstrate the convenience of storing a compacted scooter 300 and the customization of the scooter stand 10. It is anticipated that several steps may be sequentially interchangeable and equivalent application of one or more permutations of such sequentially interchangeable steps does not alter the spirit of the invention in any meaningful way.

A typical foldable scooter 300 comprises a foldable scooter stem 302 connected to a horizontal deck 304. A front wheel 306 and a rear wheel 308 are rotatably coupled to two ends of the horizontal deck 304.

The scooter stand 10 provides a vertical adjustment to accommodate scooters 300 of various heights. To find the perfect fit for the scooter 300, an exemplary user first guides the scooter 300 towards the scooter stand 10, such that the receptacle 236 accommodates the front wheel 306. Next, the exemplary user raises or lowers the vertical frame 100 in the vertical direction z to a desired height and fix the vertical frame 100 at the desired height by the first locking mechanism 112. The exemplary user can repeat the steps to find the best fit for their scooter 300, thereby stabilizing the scooter 300 using minimal floor space. Upon completion of adjusting the scooter stand 10, the scooter stand 10 is prepared for further storage of the scooter 300.

To store the scooter 300, the exemplary user may first take off a helmet 302 and place the helmet 302 on the helmet hanger 140. Next, direct the scooter 300 to move in the transverse direction x and roll the front wheel 306 of the scooter 300 along the groove 230a of the ramp 230 until the front wheel of the scooter 300 is placed within the receptacle 236. Still Next, the exemplary user folds the scooter stem 302 down close to being aligned parallelly to the horizontal deck 304 of the scooter 300 and locks the scooter stem 302 down in place. Then the exemplary user lifts the rear end of the scooter 300 into the scooter stand 10, such that the scooter 300 is in a vertical position and held by gravity. Lastly, the exemplary user may tighten the strap 132 around the stem of the scooter to secure the scooter 300 to the scooter stand 10.

To remove the scooter 300 from the scooter stand 10, the exemplary user reverses the above steps. First, the exemplary user unbuckles the strap 130. Next, the exemplary user lowers the rear end of the scooter 100 towards the ground, such that the horizontal deck 304 is parallel to the horizontal frame 200. Then the exemplary user unfolds the scooter stem 302 and rolls the front wheel 306 out of the receptacle 236.

While the embodiments of the invention have been disclosed, certain modifications may be made by those skilled in the art to modify the invention without departing from the spirit of the invention.

The invention claimed is:

1. A scooter stand comprising:
   a. a vertical frame;
      wherein the vertical frame comprises an adjusting mechanism to vary a height of the vertical frame;
   b. a horizontal frame;
      wherein the horizontal frame is perpendicularly coupled to a bottom end of the vertical frame;
      wherein the horizontal frame comprises a front bar, an intermediate bar, and a rear bar orthogonal to the horizontal frame and the vertical frame and coupled to the horizontal frame respectively;
      wherein the front bar is coupled to a front end of the horizontal frame, the rear bar is coupled to a rear end of the horizontal frame, and the intermediate bar is positioned between the front bar and the rear bar;
      wherein a joining portion of the vertical frame and the horizontal frame is positioned between the front bar and the intermediate bar;
   c. a ramp;
      wherein the ramp is carried by the horizontal frame; and
   d. a wheel stop;
      wherein the wheel stop is disposed between the ramp and the vertical frame;
      wherein the ramp, the wheel stop, and the horizontal frame form a receptacle;
      wherein the receptacle comprises a centroidal axis orthogonal to the horizontal frame and the vertical frame; and
      wherein a distance from the centroidal axis to the joining portion of the vertical frame and the horizontal frame is less than a height of the vertical frame; and
   e. a yolk;
      wherein the yoke is coupled to a top end of the vertical frame;
      wherein the yoke is on a plane parallel to the horizontal frame;
      wherein the yoke comprises two arms and a connecting member coupling the two arms, forming an opening end facing the rear end of the horizontal frame;
      wherein the connecting member is between the front bar and the intermediate bar.

2. The scooter stand as described in claim 1, wherein the yoke has a substantially U-shaped profile.

3. The scooter stand as described in claim 1, wherein the vertical frame further comprises two outer vertical bars and two inner vertical bars; and wherein each of the inner vertical bars is movably disposed within the outer vertical bars.

4. The scooter stand as described in claim 3, wherein the scooter stand further comprises a first locking mechanism positioned at an overlapping portion of each of the outer vertical bars and each of the inner vertical bars and is configured to lock the vertical frame at a desired height.

5. The scooter stand as described in claim 4, wherein the first locking mechanism comprises a set of bolt and nut.

6. The scooter stand as described in claim 1, wherein the scooter stand further comprises a linking bar coupled to the vertical frame.

7. The scooter stand as described in claim 1, wherein the scooter stand further comprises at least one support, wherein the at least one support couples to the vertical frame on one end and couples to the horizontal frame on another end.

8. The scooter stand as described in claim 1, wherein the ramp further comprises a groove.

9. The scooter stand as described in claim 1, wherein the scooter stand further comprises a helmet hanger on the vertical frame.

10. A scooter stand comprising:
    a. a vertical frame;
       wherein the vertical frame comprises an adjusting mechanism to vary a height of the vertical frame;
    b. a horizontal frame;
       wherein the horizontal frame is perpendicularly coupled to a bottom end of the vertical frame;
       wherein the horizontal frame comprises a front bar, an intermediate bar, and a rear bar orthogonal to the horizontal frame and the vertical frame and coupled to the horizontal frame respectively;
       wherein the front bar is coupled to a front end of the horizontal frame, the rear bar is coupled to a rear end of the horizontal frame, and the intermediate bar is positioned between the front bar and the rear bar;
       wherein a joining portion of the vertical frame and the horizontal frame is positioned between the front bar and the intermediate bar;
    c. a ramp;
       wherein the ramp is carried by the horizontal frame;
       wherein the ramp has a substantial slope configuration comprising a ridge portion paralleled to the rear bar and two oblique surfaces slopping down from two sides of the ridge portion;
    d. a wheel stop;
       wherein the wheel stop is disposed between the ramp and the vertical frame;
       wherein the ramp, the ridge portion of the wheel stop, and the horizontal frame form a receptacle;
       wherein the receptacle comprises a centroidal axis orthogonal to the horizontal frame and the vertical frame;
       wherein a distance from the centroidal axis to a joining portion of the vertical frame and the horizontal frame is less than a height of the vertical frame; and
    e. a yolk;
       wherein the yoke is coupled to a top end of the vertical frame;
       wherein the yoke is on a plane parallel to the horizontal frame;
       wherein the yoke comprises two arms and a connecting member coupling the two arms, forming an opening end facing the rear end of the horizontal frame;
       wherein the connecting member is between the front bar and the intermediate bar.

11. The scooter stand as described in claim 10, wherein the yoke has a substantially U-shaped profile.

12. The scooter stand as described in claim 10, wherein the vertical frame further comprises two outer vertical bars and two inner vertical bars; and wherein each of the inner vertical bars is movably disposed within the outer vertical bars.

13. The scooter stand as described in claim 12, wherein the adjusting mechanism is positioned at an overlapping portion of the outer vertical bars and the inner vertical bars and comprises a first locking mechanism configured to lock the vertical frame at a desired height.

14. The scooter stand as described in claim 13, wherein the first locking mechanism comprises a set of bolt and nut.

15. The scooter stand as described in claim 10, wherein the scooter stand further comprises a linking bar coupled to the vertical frame.

16. The scooter stand as described in claim 10, wherein the scooter stand further comprises at least one support, wherein the at least one support couples to the vertical frame on one end and couples to the horizontal frame on another end.

17. The scooter stand as described in claim 10, wherein the ramp further comprises a groove.

18. The scooter stand as described in claim 10, wherein the scooter stand further comprises an helmet hanger on the vertical frame.

19. The scooter stand as described in claim 17, wherein the groove extends along the ramp in a longitudinal direction parallel to the horizontal frame.

* * * * *